Nov. 15, 1960

J. H. WILLIAMS 2,960,581

ROTARY SWITCH

Filed Jan. 2, 1959

INVENTOR.
John H. Williams
BY Robert L. Kahn
Attorneys

United States Patent Office 2,960,581
Patented Nov. 15, 1960

2,960,581

ROTARY SWITCH

John H. Williams, Barrington, Ill., assignor to Oak Manufacturing Co., a corporation of Delaware Filed Jan. 2, 1959, Ser. No. 784,567

2 Claims. (Cl. 200—11)

This invention relates to a rotary switch of the type disclosed in United States Patent No. 2,186,949 issued January 16, 1940.

In the above identified patent, a rotary switch construction is disclosed wherein a flat insulating rotor is disposed within a circular cutout in a flat insulating stator. The stator carries contact clips having contact jaws which are generally movable to open and close along a line perpendicular to the plane of the stator.

The rotor carries flat blade-like rotor contacts, said rotor contacts overlying the opposing edges of the stator and rotor and cooperating with the stator contact jaws.

As disclosed in said patent and in other patents, a number of such rotary switch sections may be disposed in tandem so that a multisection switch may be operated from one shaft. As a rule, the individual switch sections are separately fabricated, each section having its complement of rotor and stator contacts. The rotor in each section has a non-circular aperture thruogh which a shaft is threaded for operating the various rotors.

It has been found that in multisection switches, serious damage to the switch sections results if any one or more of the switch sections is not accurately centered during switch assembly. An eccentric rotor may bind.

In those instances where the rotor contacts extend continuously around 360 degrees of arc it is impossible to see the clearance between the edges of the rotor and stator and thus determine if the rotor is properly centered.

This invention provides means for centering a rotor in such a switch section. In general, the invention contemplates the provision of at least three windows or apertures in a rotor contact for each rotor section, such windows or apertures being so located as to provide access to the clearance region between stator and rotor. The access windows or apertures are used to permit shims or pins to be disposed in the clearance region, there being a sufficient number of such shims or pins so that a rotor will be accurately centered with respect to a stator in each stator section.

When a number of stator sections are thus assembled on a pair of mounting bolts or rods, as illustrated, for example, in the above identified patent, the various stators are tightly clamped into position. Since the means for mounting sections allow considerable play before final assembly, an eccentric stator will throw a rotor off center with respect to an operating shaft. If a rotor is centered in a stator, and assuming that a shaft is properly positioned through the rotor discs, it will be clear that each switch section having its rotor properly centered will cause the stators to be properly positioned. Thereafter, if the stators are tightened in position and the shims are removed, the operating shaft will turn accurately centered rotors and will thus have uniform torque as well as permitting uniform switch action.

In order that the invention may be understood, reference will now be made to the drawings wherein Figure 1 is a detail of one switch section embodying the present invention.

Figure 1:
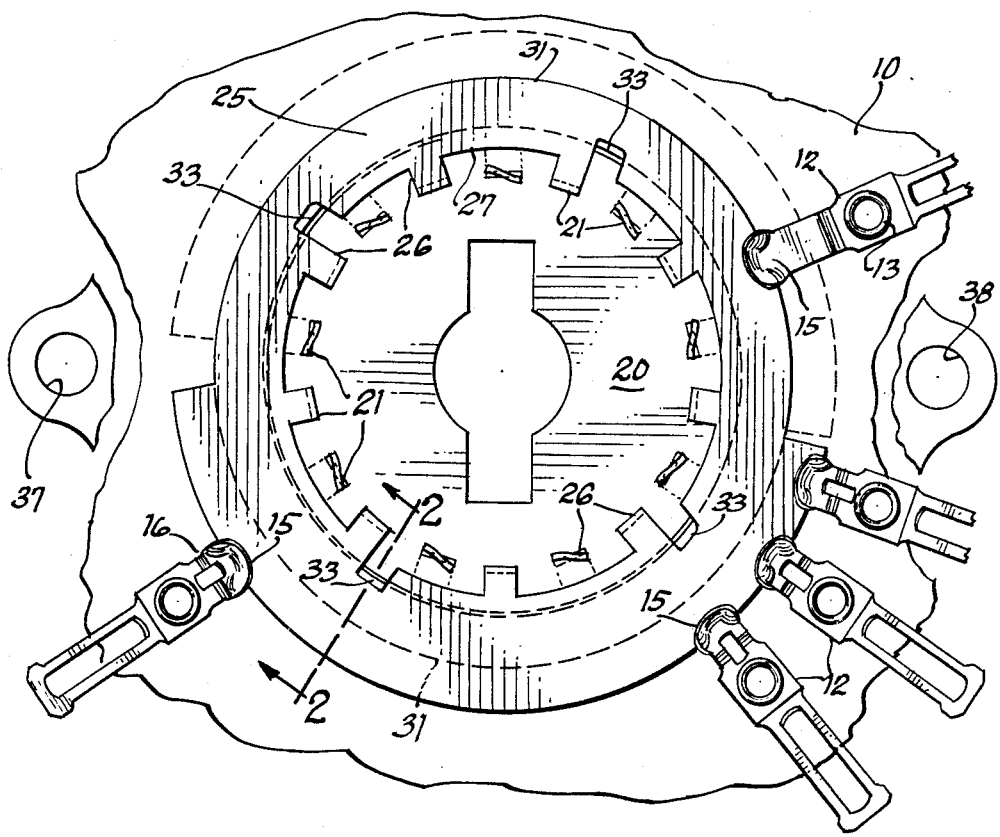
Figure 2:
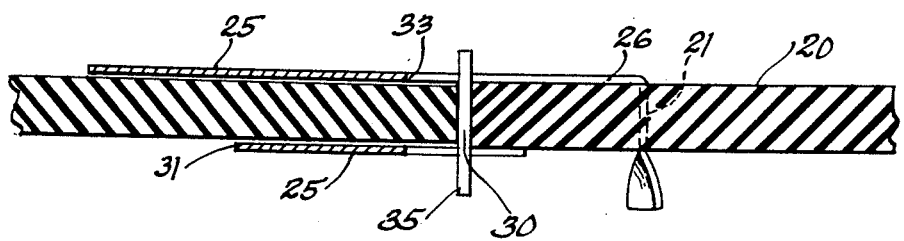
Figure 2 is a sectional detail on line 2—2 of Figure 1.
Figure 3:
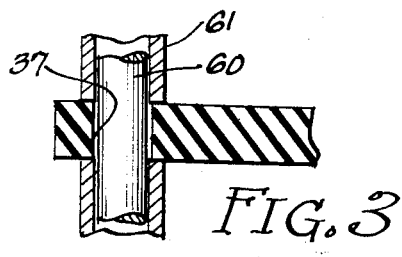
Figure 3 is an enlarged detail showing the mounting of a switch section.

A switch section comprises insulating stator 10 of suitable insulating material such as Bakelite or ceramic or other suitable material. Disposed in a generally circular pattern are a number of stator contacts generally indicated by 12. Each stator contact is secured by eyelet 13 secured to the insulating material and has a pair of jaws 15. As more fully disclosed in the patent, insulating stator 10 has cutout slots 16 to accommodate one jaw so that it can move inwardly. The stator contacts may be arranged in any desired pattern and may have similar or different effective contact lengths.

Stator 10 has a generally circular region cutout therefrom in which is disposed for rotation rotor 20. Rotor 20 may be either of one or more thicknesses of insulating material and has a number of slots 21 disposed in a circular pattern adjacent the edge of the rotor. Rotor 20 carries rotor contact 25 in the shape of a thin flat blade of metal. Rotor contact 25 is provided with a number of inwardly disposed tongues 26 which are adapted to pass through certain of the rotor slots 21. These tongues may be staked or twisted so that the rotor carries the contact firmly thereon.

As is more fully disclosed in said patent, rotor contact 25 has inner edge 27 inwardly of the edge of the rotor, the rotor contact itself having a body portion extending beyond clearance 30 between the stator and rotor. As a rule, rotor contact 25 has outer edge 31 overlying the stator and cooperating with some or all of the stator contacts.

As illustrated in Figure 1, rotor contact 25 is continuous throughout the entire 360 degrees of arc and would therefore normally cover clearance region 30. In accordance with the present invention, rotor contact 25 has a plurality of windows or apertures 33 cutout to expose a small length of clearance region 30. As illustrated here, four such windows or apertures 33 are provided. These windows or apertures are distributed around the rotor contact so that centering of the rotor may be readily accomplished. The centering may be accomplished by having flat shims or pins 35 in clearance spaces 33. Each centering shim 35 is just wide enough or thick enough to provide the desired clearance between rotor and stator. When the various windows or apertures are provided with centering shims, it is clear that a rotor will be properly centered.

It is obvious that three windows at suitable spaced intervals is the minimum number required for centering. Each centering shim 35 may subtend sufficient arc to extend along the length of clearance 30. The centering shims may be thin circular pins if desired. In general, centering shims 35 will be just a bit longer than the thickness of a switch section so that the shim projects from at least one side and probably beyond both sides of a switch section.

It is understood that if the other side of the switch section than illustrated in Figure 1, is similarly provided with a 360 degree rotor contact, that such rotor contact will be similarly in construction to rotor contact 25 insofar as the windows or apetrures 33 are concerned. Otherwise, the rotor contact 25 may have a different shape depending upon which side of the switch section it is used and also depending upon the switching arrangements.

Assuming that a switch section has been shimmed up to center the rotor, bolts 60 will be threaded through apertures 37 and 38 in the stator so that any desired number of switch sections may be mounted to be operated from one shaft. As is more fully explained in the patent, the various switch sections will be separated from each other a suitable distance by suitable means, such as sleeves 61 on the bolts, and the various rotors will be operated by a suitable shaft threaded through the registering rotor disc apertures. After the entire multisection switch is assembled and the bolts tightened to lock the switch sections in position, then the shims may be removed. Instead of bolts, other means for supporting the stators in fixed positions may be provided. In all cases, the shimmed switch sections are loosely assembled with a shaft through all the rotors. Then the stator retaining means as bolts are tightened to lock the switch sections in the predetermined positions. Thus a smoothly operating switch construction will result.

What is claimed is:

1. A rotor switch section comprising a flat insulating stator having a cutout portion, a flat insulating rotor disposed in said cutout, said rotor having a non-circular aperture for accommodating a correspondingly shaped shaft, the opposed rotor and stator edges having a clearance for smooth operation of said rotor, said stator having mounting portions so that a number of stator sections may be disposed in predetermined parallel relation for tandem operation with a common operating shaft passing through the rotors, said rotor section having at least one flat rotor contact covering the entire clearance region between the rotor and stator, stationary contacts carried by said stator for cooperation with said rotor contact, said rotor contact having at least three angularly spaced clearance windows therethrough for exposing three regions in the clearance between the stator and rotor, each rotor contact aperture accommodating a shim for passing through said rotor contact and disposed in said clearance, the three clearance windows being so disposed that three shims will properly center a rotor with respect to the stator, said construction permitting each switch section to be properly centered with respect to the tandem mounting means for a number of switch sections prior to tightening the mounting means with a common operating shaft in position whereby after a tandem switch has been assembled, each such switch section may have the shims removed and will operate smoothly.

2. The construction according to claim 1 wherein four spaced clearance windows are provided.

References Cited in the file of this patent
UNITED STATES PATENTS
2,186,949     Allison et al. _____ Jan. 16, 1940